(12) United States Patent
Lytle, Jr.

(10) Patent No.: US 9,655,356 B1
(45) Date of Patent: May 23, 2017

(54) SELECTIVE HERBICIDE AND RESPONSIBLE PESTICIDE ALLOCATION APPARATUS AND SYSTEM

(71) Applicant: Bradley Davis Lytle, Jr., Vienna, VA (US)

(72) Inventor: Bradley Davis Lytle, Jr., Vienna, VA (US)

( * ) Notice: Subject to any disclaimer, the term of this patent is extended or adjusted under 35 U.S.C. 154(b) by 0 days.

(21) Appl. No.: 15/426,143

(22) Filed: Feb. 7, 2017

(51) Int. Cl.

| | | |
|---|---|---|
| *A01M 21/04* | (2006.01) | |
| *A01D 34/835* | (2006.01) | |
| *A01D 43/14* | (2006.01) | |
| *A01M 7/00* | (2006.01) | |
| *A01M 17/00* | (2006.01) | |
| *B05B 12/12* | (2006.01) | |
| *A01D 34/00* | (2006.01) | |
| *G05D 1/00* | (2006.01) | |
| *G05D 1/02* | (2006.01) | |
| *G06K 9/62* | (2006.01) | |
| *G06K 9/00* | (2006.01) | |
| *G06Q 10/08* | (2012.01) | |
| *A01D 101/00* | (2006.01) | |
| *A01D 34/63* | (2006.01) | |

(52) U.S. Cl.
CPC ......... *A01M 21/043* (2013.01); *A01D 34/008* (2013.01); *A01D 43/14* (2013.01); *A01M 7/0089* (2013.01); *A01M 17/00* (2013.01); *B05B 12/122* (2013.01); *G05D 1/0011* (2013.01); *G05D 1/021* (2013.01); *G06K 9/00791* (2013.01); *G06K 9/6202* (2013.01); *G06Q 10/083* (2013.01); *A01D 34/63* (2013.01); *A01D 2101/00* (2013.01); *G05D 2201/0208* (2013.01)

(58) Field of Classification Search
None
See application file for complete search history.

(56) References Cited

U.S. PATENT DOCUMENTS

| | | | | |
|---|---|---|---|---|
| 7,417,731 | B1* | 8/2008 | Masten | A01M 7/0089 356/328 |
| 2004/0034459 | A1* | 2/2004 | Hoelscher | A01M 7/0089 701/50 |
| 2011/0231217 | A1* | 9/2011 | Hand | G06Q 10/047 705/7.12 |
| 2015/0245565 | A1* | 9/2015 | Pilgrim | A01G 7/06 280/79.2 |
| 2017/0031365 | A1* | 2/2017 | Sugumaran | B64C 39/024 |
| 2017/0039425 | A1* | 2/2017 | Itzhaky | G06K 9/00657 |

* cited by examiner

*Primary Examiner* — Shelley Chen
(74) *Attorney, Agent, or Firm* — Lytle Patent Services, LLC

(57) ABSTRACT

A lawn treatment apparatus, system and method employs a scanning apparatus to detect the presence of an area to be selectively treated with an herbicide, pesticide or fungicide. The apparatus includes a multicompartmental cartridge that holds different chemicals and selectively applies the chemicals to the area of the lawn requiring treatment.

16 Claims, 11 Drawing Sheets

SELECTIVE HERBICIDE AND RESPONSIBLE PESTICIDE ALLOCATION APPARATUS AND SYSTEM

BACKGROUND

Description of the Related Art

The background description here is provided for the purpose of generally presenting the content of the disclosure. Work of the presently named inventor, to the extent it is described in this background section, as well as aspects of the description which may not otherwise quality as prior art at the time of filing, are neither expressly nor implicitly admitted as prior art against the present invention.

Conventionally, herbicides are used to treat a person's lawn through the application of broad spectrum herbicide, which attaches to the leafs of broadleaf weeds and attacks those plants to which the granules adhere. As recognized by the present inventor, the broad spectrum herbicide is neither specifically targeted toward the particular type of plant that is the target of the herbicide, and so an entire lawn is processed.

Alternatively, an individual can apply a particular nonselective chemical, such as ROUNDUP, and "spot spray" to kill particular weeds. However this is a monotonous task and once again a single chemical was used that does not discriminate between the weed and the surrounding grass and so brown spots are prevalent after the application of the herbicide. Likewise, with regard to insects on the lawn, often broad spectrum insecticides are used to kill all the insects on the lawn, even though a number of the insects are not problematic to humans. Moreover, there are "good bugs", that tend to eat "bad bugs" but the insecticide does not discriminate between good bugs and bad bugs. As recognized by the present inventor, when an entire lawn is subject to insecticide treatment, both the good bugs and the bad bugs are killed, and children and animals who may play in the yard also absorb some of these harmful chemicals through dermatitis contact.

SUMMARY

The foregoing paragraphs have been provided by way of general introduction and are not intended to limit the scope of the following claims. The described embodiments, together with further advantages, will be better understood by reference to the following detailed description taken in conjunction with the accompanying drawings. Moreover, the present inventor recognized that broad spectrum application of herbicide and insecticide, is an over-application of chemicals to a lawn or other field to be treated. Essentially homeowners are encouraged by herbicide manufacturers to carpet bomb their yards to control the weeds therein. Homeowners are then warned to keep their children and pets off the lawn for a period of time so as to avoid having them absorb the toxins in the chemicals. The excess chemicals can be absorbed by a human body and/or animals, or otherwise may be harmful to desired plant species (grass) or insects. In light of these limitations the present inventor recognized that there is a need for more particular application of specific chemicals applied on a "spot treatment" application after visually identifying and detecting the target plant species and/or insect, to be treated. Once identified, the plant or insect that was previously identified, is subject to an application of a chemical specific to that plant species or insect by selective spray directly to the affected area. This approach avoids the problem of overuse of chemicals on a lawn thus avoiding harmful effects as well as the expense of obtaining excess chemicals.

The present inventor also recognized the persistent nature of weeds and insects has a vulnerability: they are rooted (or burrowed) in the same spot in the lawn, although their appearance may change after being treated with chemicals or altered with the blade of a lawnmower. However, if the lawnmower were multipurposed, such as to both cut the grass blades, and optically monitor weed and insect growth/decline on a periodic basis, the amount of chemicals needed to effectively treat the lawn could be greatly reduced as compared to conventional carpet bombing techniques.

Furthermore, the present inventor recognized a lawn mower may be equipped with a scanning device and selective chemical applicator. Under control of electronic controller, the specially equipped lawnmower can identify and catalogue the species of target weeds, and insects, and use that information (either locally in a processor, or remotely at a computing facility once the raw data is transmitted from the lawnmower to the remote facility) in identifying the proper herbicides and insecticides to be sprayed on the affected area in a subsequent application. Moreover, once it is known that the particular lawn has X-number of dandelions, chickweed, . . . , that information may be used to determine the optimal type of chemicals and volume of chemicals needed to effectively treat the lawn. On a week to week basis, or another interval at which the lawnmower is used to scan the lawn, the corresponding chemicals are added to a multi-compartmented cartridge using a filling station at a remote facility and shipped to the homeowner for the next lawn mowing cycle through a shipping center. The shipping center then packages and ships the cartridge to a predetermined address, such as the address of where the lawn is located or an address of a lawn care provider. In this way, only the chemicals most appropriate for treating the target plant species and insects are used. The multi-compartmented cartridge is detachably attachable to the lawn mower so that as the homeowner cuts the lawn a next time, the residual weeds and insects are detected once again and the cartridge selectively sprays the affected areas so as to treat the affected area overgrown by the invasive weed, or undesirable insect. Because the cycle is repeated, the growth rate of the weeds or insect nests can be monitored and the treatment can be gradually adjusted over time, or altered to a more effective treatment. Unlike conventional techniques that that have one shot to "nuke" the weeds or insects, less harmful chemicals may be used, such as vinegar in the case of broadleaf perennials, because the treatments can be more gradual, and repeated so the weeds/insects eventually succumb to the repeated treatments.

The present inventor also recognized that the scanning/cutting/application process need not be propelled by a human. Instead the lawnmower can operate autonomously and follow a same pattern week after week, and recording the type of weed/insect at particular locations along the path followed by the lawnmower.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
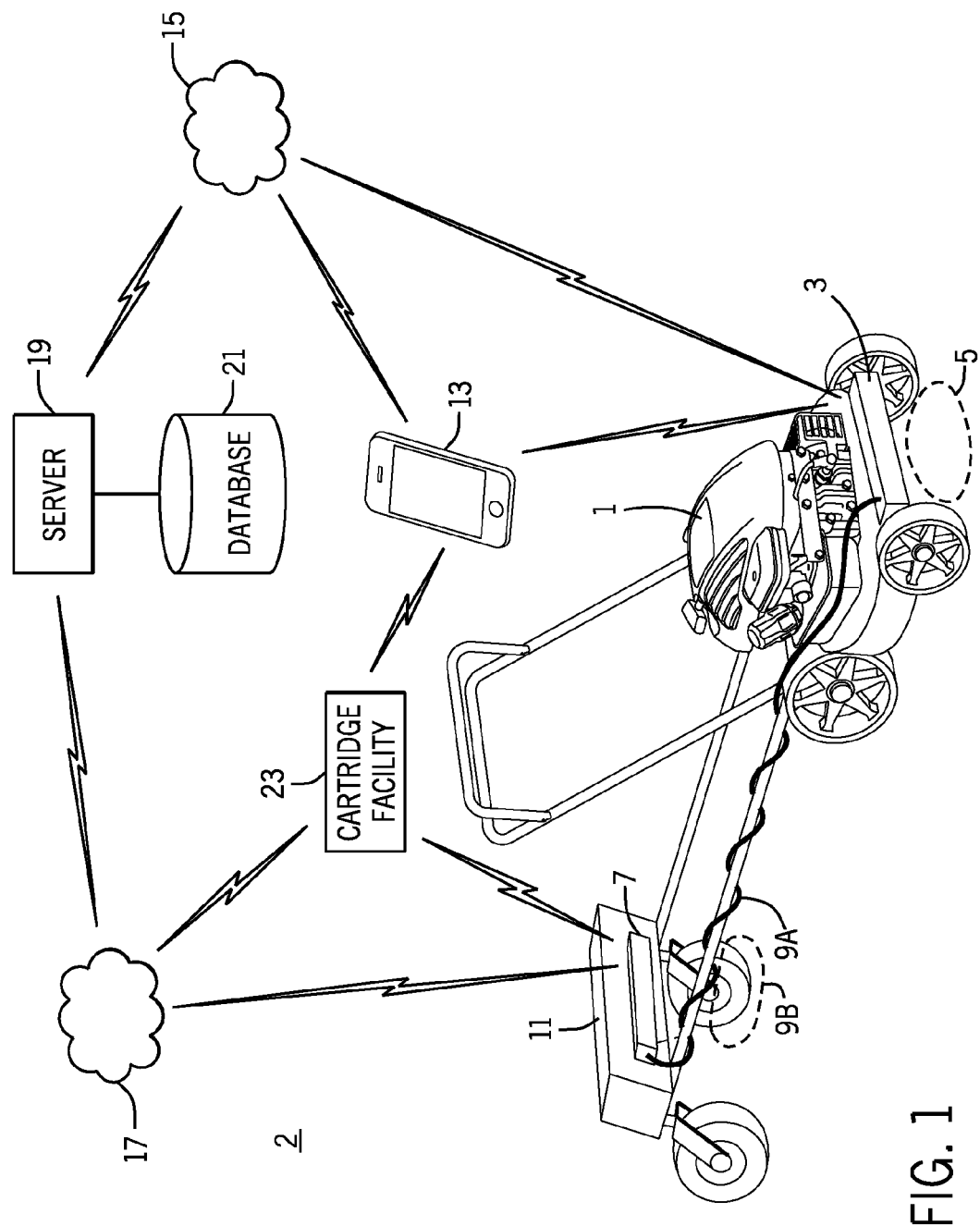
FIG. 1 is a system level diagram of a Selective Herbicide and Responsible Pesticide (SHARP) allocation system according to an embodiment.

Referring now to the drawings, wherein like reference numerals designate identical or corresponding parts throughout the several views.

FIG. 1 is a system level diagram of a Selective Herbicide and Responsible Pesticide (SHARP) allocation system 2 that includes a vehicle, which in the present example is a lawnmower 1. However, the vehicle could be other mobile devices such as a drop-spreader, or other device that is capable of traversing a yard with grass or other material that might have weeds or insects. Moreover, the lawnmower 1 can be pushed by a human, or autonomous (self-driven, according to a self-selected path, a memorized path, or a programmed path) with a propulsion and navigation system. The lawnmower 1 hosts a front scanner 3 that optically scans an area in front of (in a moving direction of) the lawnmower 1. Optionally, the front scanner 3 emits a light beam 5 used to better illuminate the grass/weeds/insect-mounds in front of the lawnmower and detected by the front scanner 3. The front scanner 3 captures images of the front area so that image recognition hardware and/or software, configured according to the teachings herein, identifies the type of weed and/or insect nest in the scanned area. CCD or CMOS scanners may be used, as well as digital cameras (such on a smartphone, as will be discussed later).

The lawnmower 1 has a detachably attachable trolley that connects with parallel bars to a chassis of the lawnmower 1 and is towed behind the lawnmower 1. An operator of the lawnmower walks between the parallel bars. The trolley has a trolley chassis that carries a smart cartridge 11 as will be discussed in more detail with respect to FIGS. 2, 3 and 4. An operator of the lawnmower walks in a space framed-in by a back of the lawnmower 1, the parallel bars that tow smart cartridge 11, and the smart cartridge 11 itself. The smart cartridge 11 (or trolley) hosts a back scanner 7 that performs a similar function to the front scanner 3, and optionally emits a light beam 9B in a similar way to the light beam 5 that is optionally emitted by the front scanner 3. While the front scanner 3 detects target objects such as weeds in the present embodiment, it is also configured to scan and detect insect mounds, fungus spots, etc. Likewise, the back scanner 7 scans and detects the same objects after they have been mowed over, as will be discussed in greater detail in FIG. 5.

In the example of weed treatment, the front scanner 3 constantly scans the area in front of the lawnmower 1 and performs image detection using its controller and on-board memory and associates a location stamp (using a detected position in a mowing pattern, FIG. 10) in the area being treated. The location stamp may include a GPS location, but also includes a much more accurate position with respect to the mowing pattern that is repeated week after week. In this embodiment the scanners and processors perform the detection and classification. Alternatively, the front scanner 3 transmits wirelessly all or a portion of the imagery and position data to a remote computer for remote detection. Alternatively, or as a complement to the image detection performed by the front scanner 3, the SHARP system may also use the back scanner 7 to corroborate, via cable 9A, a potential detection made by the front scanner 3. Because the back scanner 7 is a predetermined distance (e.g., between 5 and 15 feet) behind the front scanner 3, the back scanner 7 will be alerted by the potential detection of the front scanner 3 of a particular target, which will allow the back scanner 7 to have retrieved a relevant post-mowed image or set of images (see e.g., FIGS. 5 and 11) of a particular target so the likelihood of a false detection can be minimized.

During a first scan of the treatment area data is collected regarding the type, number, size, and respective positions of different types of weeds. Optionally, positions and numbers of detected anthills, in-ground bees' nests, etc., may be collected during an initial scan of the treatment area.

Data collected by the SHARP system during the initial scan is then transmitted wirelessly to a remote computer (server) 19 by way of a cellular telephone channel (e.g., as controlled by an app executed on a Smartphone) or sent to the server from either the front scanner 3 or the back scanner 7 via networks 15, 17. Alternatively, the collected data is retained in the lawnmower control circuitry (FIG. 12) and once the scanning/cutting operation is completed, the circuitry can be connected via a communication port to a network, which conveys the data to the remote server 19. As will be discussed, the data collected includes the types of weeds (and other targets) in the treatment area, their respective positions/size, and number of weeds (and other targets) in the treatment area. With this information, the server 19 retrieves information from a database 21 (see Table 1) regarding the best type of herbicide to kill the specific type of weeds that are detected. The "best" type of herbicide need not be the herbicide that kills the weed in a single application, but may be a user selectable herbicide that is human/pet friendly (e.g., vinegar), albeit only effective after repeated applications. Once all of the targets are analyzed, the server 19 dispatches a request to a cartridge filling facility 23, which fills a smart cartridge 11 with herbicides that are effective for the detected weeds, and in sufficient volume so as to be able to treat the entire lawn. For particularly "weedy" lawns, more than one smart cartridge 11 may be used. Furthermore, the smart cartridge 11 may be equipped with a memory that the server 19 can use to record position information relevant to the mowing track of FIG. 10. With this information, the memory may provide the position information to the front scanner 3 so the front scanner 3 can emit visual or audio feedback to an operator to realign the movement of the lawnmower 1 with the past mower positions during the initial scanning run. Keeping the lawnmower 1 as near as possible to the same path of the initial scanning run, increases the likelihood that during the subsequent treatment run, the smart cartridge 11 will identify and treat the target areas with the proper chemicals. The challenge of detecting dead or dying weeds is aided by the knowledge of precisely where the weeds are located in the lawnmower path, and by having two scanners.

Once the smart cartridge 11 is filled with the custom amounts of herbicides and pesticides for the particular lawn, the smart cartridge 11 is shipped to the address of the user. The user then mounts the smart cartridge 11 to the SHARP system and, as will be discussed, the SHARP system will treat the target areas with the proper quantities of the most effective chemicals/materials (e.g., powders) for the target objects to be treated. Because the smart cartridge 11 is located behind the operator of the lawnmower, the weeds/insects/diseased areas are treated behind the feet of the user. Thus, the user does not step in the chemicals/materials and inadvertently spread the chemicals/materials to unintended grass plants.

Unlike with conventional systems and methods that apply broad-spectrum chemicals over an entirety of a lawn, an advantage with this approach is that is only uses those chemicals that are effective on the particular target, and the amount of chemicals/materials is substantially lower because they are applied directly to the targets themselves. Restricting the amount of potentially toxic chemicals/materials on a yard is not only environmentally friendly, but it is also protective of struggling species (such as honey bees) and limits the potentially cancerous effects on humans and pets who are exposed to the chemicals/materials when walking/running/playing in the yard. Furthermore, the approach is substantially more economical since only the effective amount of chemicals need to be purchased, rather than purchasing chemicals that are applied to portions of the yard that do not require treatment.

Figure 2:
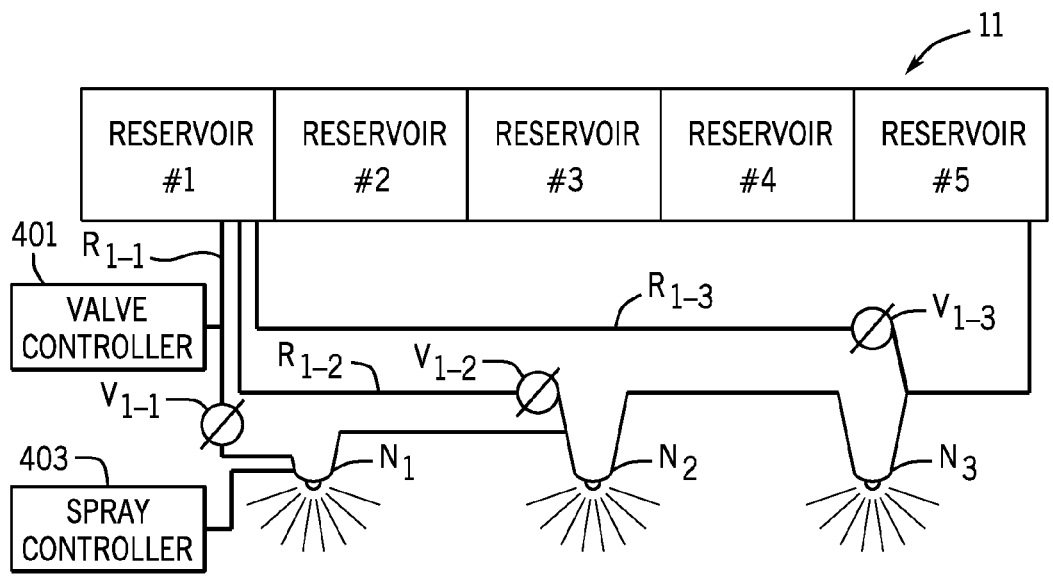
FIG. 2 is a top view of a SHARP smart cartridge.

FIG. 2 is a top view of a SHARP smart cartridge 11, which contains one or more reservoirs for holding different, or the same herbicides/pesticides/fungicides. A five reservoir smart cartridge 11 is used in the present embodiment, although any number (e.g, 1 to 10) of reservoirs may be used depending on the needs of a particular lawn during a particular application cycle. The smart cartridge 11 includes three nozzles N1, N2, and N3 distributed along the length of the smart cartridge 11. Other embodiments may include between 1 through 7 spray nozzles, for example. As a further embodiment, the nozzles are optionally separable from the smart cartridge 11 so that once a new smart cartridge 11 with refilled contents is attached to the mower 1 (FIG. 1), feedlines from the nozzles connect to the reservoirs in the smart cartridge 11.

In the smart cartridge 11 of FIG. 2, feedlines R1-1, R1-2 and R1-3 convey chemicals contained in reservoir #1 to nozzles N-1, N-2, and N-3 respectively. Similar feedlines (not shown for image clarity) are provided to convey chemicals contained in each other reservoir to each of the three nozzles. A similar nomenclature would be used to identify these feedlines. For example the feedlines that provide the chemical from reservoir #2 to the nozzles N1, N2 and N3 would be labeled R2-1, R2-2, and R2-3.

Fluid flow from each feedline is controlled by a separate controlled valve (e.g., V1-1) that is controlled by valve controller circuitry 401. In one example, the valve controller circuitry is a programmed computer that receives reservoir, volume, and spray pattern input from the SHARP controller as will be discussed in FIG. 12. Thus, once the back scanner 7 detects that nozzle N1, for example is approaching a weed to be treated with the chemical contained in reservoir #1, the back scanner 7 instructs the valve controller circuitry 401 to spray the chemical on the weed at the location, volume and pattern (Table 2) it is instructed to do. A spray controller 403, as will be discussed with regard to FIG. 4, controls a nozzle ring on nozzle N1, for example, which controls the spray pattern (e.g., spot, narrow, fan, broad, fully open), consistent with the shape of the post-mowed weed. The valve controller 401 controls valve V1-1 to control the fluid flow from reservoir #1 to nozzle 1. Likewise it controls a valve V2-1 to control the fluid flow from reservoir #2 to nozzle 1, etc. Likewise the spray controller 403 controls nozzles N2 and N3 in a similar way.

Figure 3:
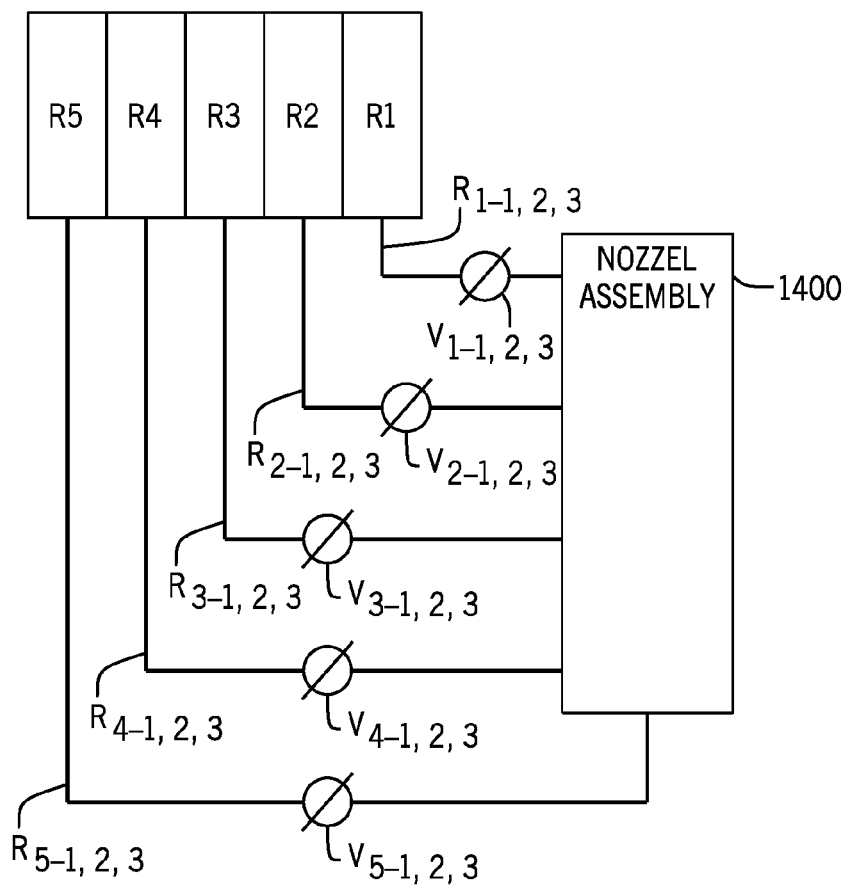
FIG. 3 is a side view of a SHARP smart cartridge that shows connections to a nozzle assembly.

FIG. 3 is a side view of a SHARP smart cartridge 11 that shows connections to a nozzle assembly 1400. More particularly, feedline R5-1 is shown to be connected to control valve V5-1. Similar feed lines and valves exist between reservoir #5 and nozzles N2 and N3, which are represented by the nomenclature R5-1, 2, 3, and V5-1, 2, 3 respectively. Likewise separate feedlines R4-1, 2, 3 from reservoir #4 connect respectively to valves V4-1, 2, 3 and then to the nozzle assembly 1400. Feedlines R3-1, 2, 3 and valves V3-1, 2, 3; feedlines R2-1, 2, 3 and valves V2-1, 2, 3; and feedlines R1-1, 2, 3 and valves V-1, 2, 3 interconnect reservoirs 3, 2, and 1 to the nozzle assembly 1400 in a similar way. By arranging the reservoirs and nozzles in this way, it is possible to controllable supply any chemical from any reservoir to any nozzle, and so the appropriate chemical can be applied to a target weed (or insect nest, or diseased spot) d of the weed's relative position along the broadside of the SHARP smart cartridge 11.

Figure 4:
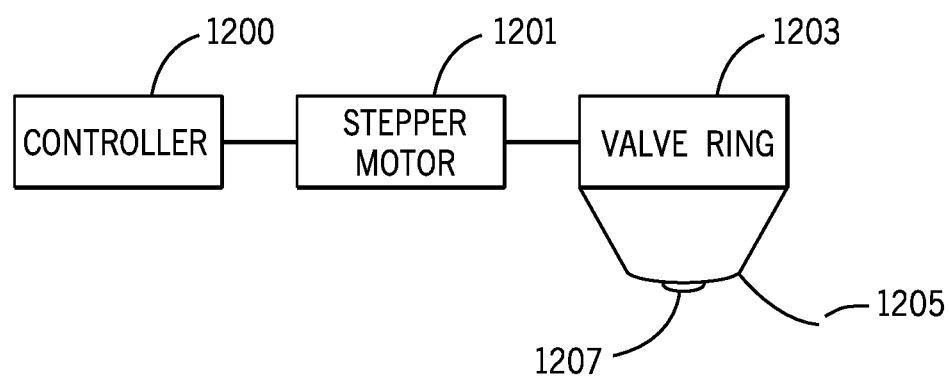
FIG. 4 is a schematic of electronic circuitry that controls a volume and spray pattern of a nozzle.
Figure 5:
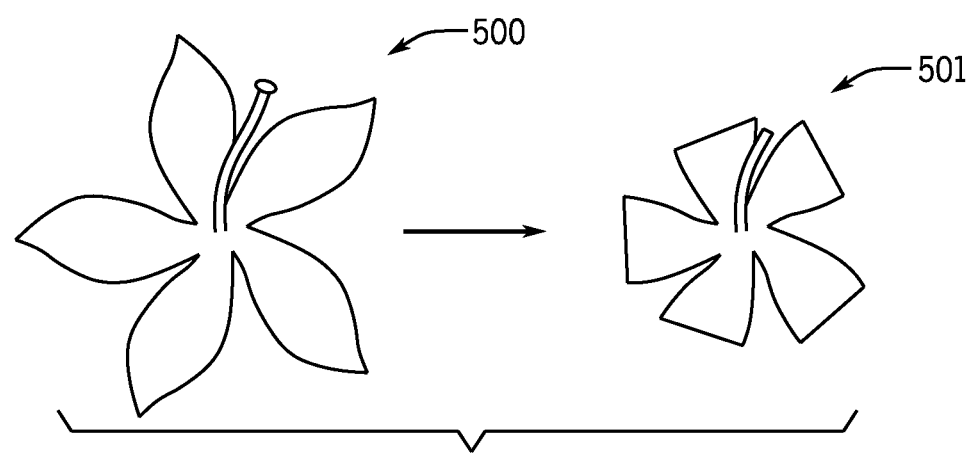
FIG. 5 shows a change in shape of a weed before and after being mowed over.

FIG. 4 is a schematic of electronic circuitry that control a material and spray pattern of a nozzle. In particular the nozzle includes a conical body 1205 with an opening at the top of the body 1205. The opening remains open when a stopper plug 1207 is drawn inside of the body 1205. The opening is fully or partially closed when the stopper plug 1207 is fully or partially inserted into the opening. The movement of the stopper plug 1207 is controlled by a rotation of a control ring 1203. When driven to turn one way, the stopper plug 1207 retracts the stopper plug 1207, and when driven to turn the other way, the stopper plug 1207 extends into the opening. The spray pattern is dictated by the volume of fluid emitted, which by the way is placed under pressure by pumps disposed in each reservoir. The volume is controlled by the valves as previously discussed, but the pattern of spray is controlled by the position of the stopper plug in the opening, much the same way a water spray pattern is controlled by the nozzle on a garden hose. A wider pattern is created when the stopper plug is closer to the opening, and a narrower pattern is created when the stopper plug is further withdrawn from the opening. Different spray patterns can be implemented with different shaped bodies, plugs or diffusers, or a multiplicity of openings in the body, with the openings selectably emitting the liquid to the left, right, straight, etc.

Generally the breadth of the spray pattern set to be controllably extend from 0.5 inches across to 10 inches across for a three nozzle system. The resolution of spray pattern and target accuracy is a function of the number and pitch of nozzles in the nozzle assembly. For example, a single spray nozzle would ideally produce a breadth of 21 inches, or what ever is the width dimension of the mower deck used with the spray assembly. However, a fan spray pattern will also apply product to areas that do not need treatment, creating waste and unnecessary treatment areas. The spray patterns for a 2 nozzle system need only cover half the same region as a single nozzle system, and so on. For a conventional push mower, three nozzle system produces three spray patterns at 7 inches each; a four nozzle system produces roughly 5 inch spray patterns; a five nozzle system roughly produces 4 inch spray patterns, and so on for 6, 7, 8 and 9 nozzle systems.

With regard to the treatment of a particular weed, the pattern need not be a single fan type pattern. For example, when approaching a dandelion with a generally disc-shaped footprint, the spray pattern is initially a narrow stream projected toward a forward portion of the dandelion and as the dandelion approaches further due to the motion of the smart cartridge 11, the nozzle spray expands to cover a greater portion of the dandelion surface and then as the dandelion begins to move under the smart cartridge 11, the spray pattern is narrowed again, and emitted at a lower pressure to cover the trailing portion of the dandelion.

FIG. 5 shows a change in shape between a pre-cut dandelion 500 and a post-cut dandelion 501. The pre-cut dandelion 500 has a recognizable shape which is captured by the front scanner 3 and used by the front scanner 3 or remote server 19 to help identify the species of plant (or insect nest, or disease patch) by comparing the image to prestored images and looking for a match within a selectable tolerance. The post-cut image, which is captured by the back scanner, is also used to corroborate the species match, and thus once identified, select the most effective chemical for treating the weed. By the way, if the total number of selected chemicals is greater than the number reservoirs in the selected smart cartridge 11, the server will select a broader spectrum herbicide that can adequately treat multiple species of weeds. In a worst case situation, such as weed, insect and disease spots in the yard, a three nozzle system will only be able to select a single chemical to treat all of the weed species. In this instance, an indiscriminating herbicide might be selected, such as ROUNDUP.

The back scanner 7 also captures the size of footprint of the post-cut image. The difference in footprint size between pre-cut and post-cut plant size is largely dictated by mower height relative to plant height. The back scanner 7 captures the post-cut image and determines (or the remote server determines) the area that needs to be treated, the spray pattern that will be most effective, and the associated amount of chemical to be used to treat the particular weed. The total quantity of chemicals needed for a particular weed is a summation of the amounts needed for the total quantity of particular weed species. As will often be the case, some weed species are more prevalent in the spring than in the summer or fall. Accordingly, the total volume of chemicals needed to treat a widely spread weed species may surpass the capacity of one reservoir in the smart cartridge 11. In this circumstance a second reservoir is dedicated to that chemical, or even a third or more may be used as well.

FIG. 6 is a schematic diagram of scanner circuitry according to an embodiment. In the present embodiment, the scanner circuitry 3 includes dedicated circuitry. However, scanner circuitry 3 may also include a mounting bracket for Smartphone 13 that uses the camera function in the Smartphone 13 to perform the scanning operation. In that embodiment, the Smartphone 13 mounts to the scanner circuitry 13 through a mounting bracket, adhesive, or a rare earth magnet casing on the scanner circuitry 13 to which a metal plate adhered to the back of the Smartphone 13 would magnetically attach Smartphone 13 to the scanner circuitry 13. In each embodiment, the Smartphone 13 would be detachably attached to the scanner circuitry 3.

However, in the present embodiment the scanner circuitry 3 is dedicated circuitry that interconnects several electronic devices by way of a bus 200. A CPU 201 connects through the bus 200 to a memory 203 and is provided with power from battery 205. As an alternative, a generator 207 may take electrical current produced by the engine of the lawnmower 1 and provide power to the scanner circuitry 3 for powering the respective devices and circuitry contained with the scanner circuitry 3. The CPU 201 as will be discussed, may be a programmable microcontroller, microprocessor, or even an application specific integrated circuit. The CPU performs the various algorithms as will be discussed in FIG. 7 for example. The CPU also connects through the bus 200 to a transceiver 213 that transmits signals either locally through a Bluetooth connection to the Smartphone 13 or directly to a remote server 19 through a cloud or other wireless network (see e.g., FIG. 1). The scanner circuitry 3 is placed at the front of the lawnmower 1 (FIG. 1), and sends and receives information via an I/O port 215 not only wirelessly through the wireless communication network 15, but also through a physical connection to the SHARP smart cartridge 11 through a dedicated cable, as shown. Moreover, the electrical and digital communications sent over the cable 9 is provided to the back scanner 7 that attaches to the SHARP smart cartridge 11.

Returning to FIG. 6, in the scanner circuitry 3, the CPU 201 interconnects to control a light bar 211 and a scanner/sensor 209. Moreover, the light bar 211 projects light (as controlled by the CPU) in front of the lawn mower 1 so as to cast a light beam 5 in front of the lawn mower 1. This casting of the light beam 5 in front of the lawn mower 1 helps to illuminate the area in front of the lawn mower and enhance the scanning/sensor 209 capability for detecting of weeds and insect nests, etc.

In operation, the scanner circuitry 3 uses the CPU to control the light bar and scanner/sensor 209 as provided with power from the battery 205 and/or the generator 207. Moreover, power provided from the generator 207 can recharge the battery 205 or provide power to the circuit components in the scanner circuitry 3 for normal operation. The scanner/sensor 209 scans the area in front of the lawn mower 1, as illuminated by the light beam 5 provided by the light bar 211 (an optional light beam 5, is mostly used during poorly lit conditions). The CPU receives the scanner/sensor information from the scanner/sensor 209 and performs a match with detected weeds saved in memory 203 so as to identify particular locations of the particular weeds. The locations and image of a detected weed are saved in correspondence in the memory 203 (location and potentially detected weed). The location information is received continually from the CPU 201 via a GPS module that is either included in the Smartphone 13 which is in proximity to the lawn mower 1 or attached to the lawn mower 1, or alternatively included within the transceiver 213. In this way, the GPS detected location of the potential weed is stored in correspondence with the detected weed in memory 203. The GPS location is augmented with the lawnmower position in its path, which is kept by tracking the movement of the lawnmower wheels across the lawn on the same path that was previously followed. Alternatively, lawnmower position may be tracked via triangulation from three or more receiving antennas that observe a beacon transmitted from the transceiver 213. Subsequently, the CPU 201 sends the corresponding location and detected weed information from the memory 203 either in real time or in batch after the entire (or portion) of the lawn has been cut through a wireless network to the server 19. Alternatively, the information may be stored in the Smartphone 13 and then the Smartphone 13 may later be connected to a wired communication network so that the data may be uploaded to the server 19. Furthermore, the potentially detected weed as detected by the front scanner 3 is used to send a signal to the back scanner 7 so as to alert the back scanner 7 that a potential weed has been detected by the front scanner circuitry 3. Then the back scanner 7 detects the location of the weed and performs a higher resolution scan on the weed information so that the location and type of weed match may also be sent to the remote server 19 either directly or by way of the memory 203 and/or memory in the Smartphone 13. In this way, a two-step detection of the weed and its respective location is performed through the scanner circuitry 3, and the similar structure and scanner circuitry is used in the back scanner 7 so that the second step of detection may be performed.

Figure 6:
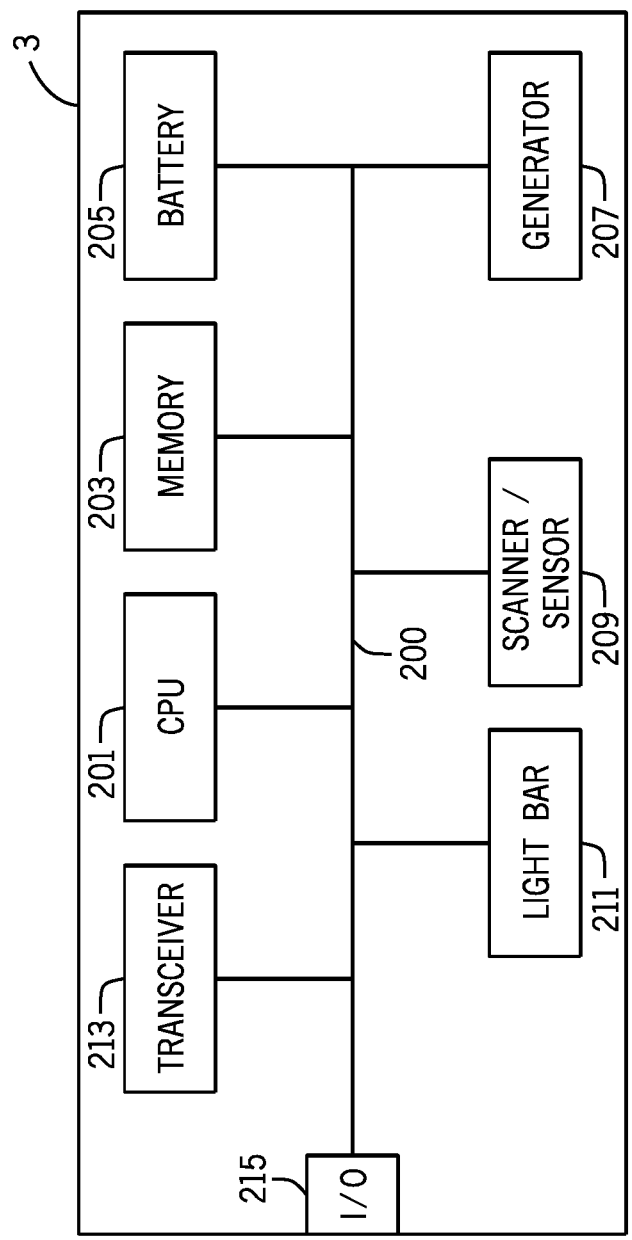
FIG. 6 is a schematic of scanner circuitry.
Figure 7:
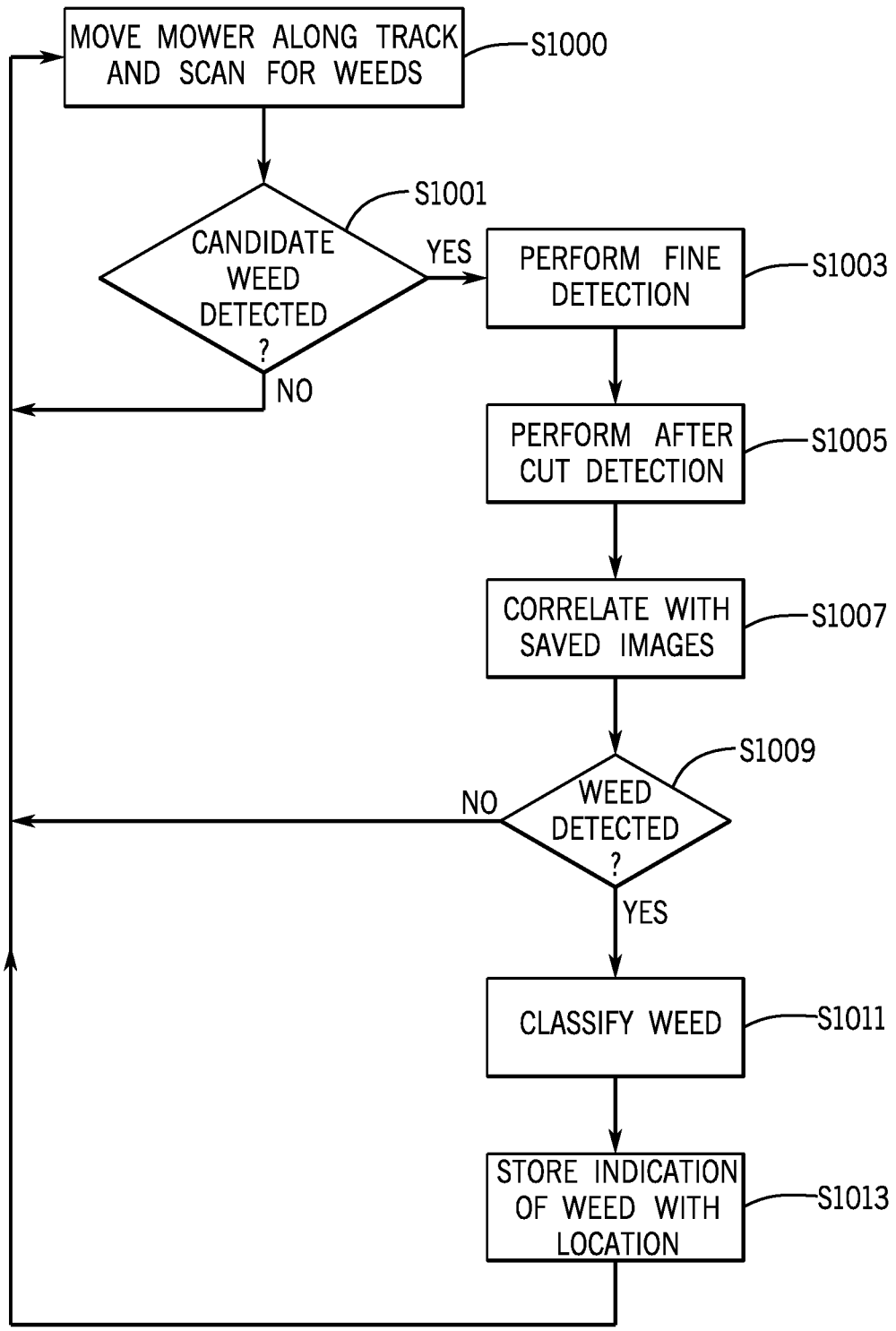
FIG. 7 is a flowchart of a weed detection process performed by an embodiment of the SHARP system.

FIG. 7 is a flowchart showing a process flow performed by the CPU 201 (FIG. 6). The process begins in step S1000 where the lawn mower is moved along the cutting path ("track") and a scanning operation is performed with the scanner circuitry 3. The process then proceeds to step S1001 where the image collected by the scanner circuitry 3 is compared with weed images stored in the memory 203 to determine whether there is a potential match. An example repository of images is provided by the University of Maryland Extension, Lawn Weed identification at https://extension.umd.edu/hgic/lawns/lawn-weed-identification#winterannual or "A Photo Handbook of Weeds Identification and Green Grass Lawn Care for Picture Perfect Turf 1st Edition", NC Weed Killer, CreateSpace Independent Publishing Platform; 1 edition (Jul. 4, 2014), ISBN-10: 1500312487000, the entire contents of bot of which being incorporated herein by reference in their entirety. If the response to the inquiry in step S1001 is negative, the process returns to step S1000. However, if a candidate weed is detected, the process proceeds to step S1003 where a find detection process is performed so as to not only determine whether a weed is detected, but also the potential type of weed. This information is then sent to the back scanner 7, which includes similar circuitry to that and front scanner 3. The process then proceeds to step S1005 where the lawn mower cuts the weed and then the back scanner 7 performs a similar series of steps with regard to comparing the potential weed image with pre-stored cut images of weeds to determine whether there is a potential weed at the particular location. The process then proceeds to step S1007 where a correlation is made with the cut images of the weeds with the saved images in memory to determine with a higher degree of certainty whether a weed exists at that particular location. The process then proceeds to step S1009 where a query is made regarding whether a weed was detected. If no weed was detected the process returns to step S1000. However if a weed was detected the process proceeds to step S1011 where the initial image of the weed and the cut image of the weed are compared to pre-stored images in memory in an attempt to actually classify the weed. That classification may be performed locally with the front scanner circuitry 3 and back scanner circuitry 7, alternatively in combination with the Smartphone 13, which may include an app that includes image files of weeds for that particular area, or the classification may be performed by the server 19. Subsequently the process proceeds to step S1013 where the indication of the weed is stored in combination with the location. This information is then used later at the server (or alternatively locally at the lawn mower) to determine the particular types of weeds, number of weeds and as a consequence the amount of chemicals needed to be placed in the smart cartridge 11 by way of the cartridge facility 23 (FIG. 1). Size of the weed is also detected and captured. Likewise, the relative size and shape of the weed is kept from one cycle to the next so the progress in effectively killing the weed is observable, and corrective action (such as chemical substitution) can be taken if the weed has not degrade sufficiently over time.

Figure 8:
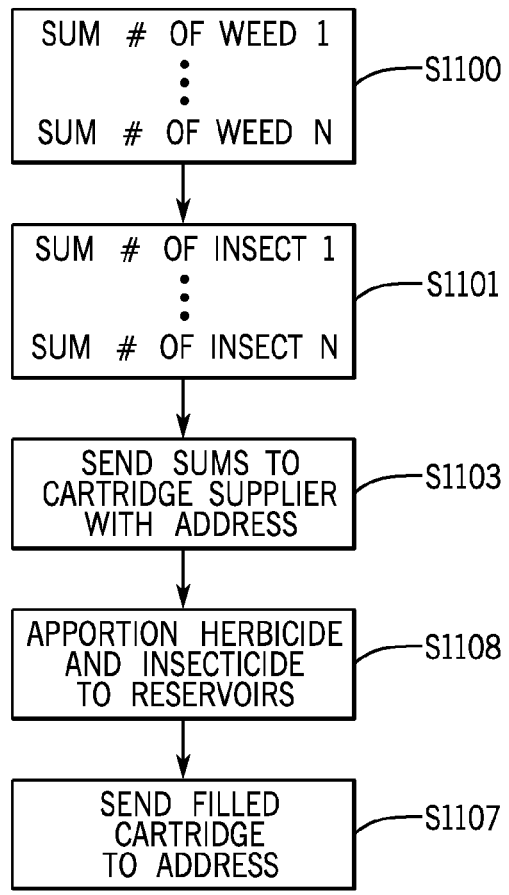
FIG. 8 is a flowchart of a product aggregation and ordering process performed by an embodiment of the SHARP system.

FIG. 8 is a process flow for identifying the type and amount of insecticide and herbicides to be included in the smart cartridge 11 for application to the lawn of the user in a subsequent cutting/application operation of the lawn. The process begins in step S1100, where a sum total of all of the weeds one through n is accumulated at the server 19. In the present embodiment it is assumed that the server 19 performs the analysis on the number of weeds and amount of product to be provided to the particular user of the lawn mower 1 as will be provided to the cartridge facility 23. After step S1100 the process proceeds to step S1101, where the number and type of insect mounds are identified. The process then proceeds to step S1103 where these sums are provided to the cartridge facility 23 so that a smart cartridge 11 may be prepared for the particular user's lawn. Alternatively, the amount of chemicals may be determined at the server 19, on the Smartphone 13, or even on the scanners 3 or 7. Nevertheless, based on the number and types of weeds, and number and types of insects, the cartridge facility 23 in step S1108 apportions the type of herbicide and amount of herbicides and insecticides to the respective reservoirs in the smart cartridge 11. Once filled, the cartridge facility 23 sends (through courier, mail, etc.) the filled smart cartridge 11 to the address of the user of the lawn mower 1 in step S1107. Of course the smart cartridge 11 may actually be sent to the maintenance service provider for the particular lawn. The point is that a particular customized smart cartridge 11 with the appropriate amount and type of herbicide and insecticide are prepared for the lawn to be treated by the SHARP lawn mower system 2 so as to treat the specific weeds and insect nests for that particular lawn without an undue amount of chemicals being applied to the lawn universally. The homeowner may also fill the smart cartridges 11 with the appropriate chemicals in response to receiving data describing the appropriate amount and type of chemicals to include in the reservoirs.

Table 1 below describes common lawn weeds found in Virginia along with example pre-emergent, post-emergent, selective, non-selective, and organic herbicides used to kill those weeds. For example, Dandelions, which are a common type of broadleaf weed are effectively treated with the industrial chemical MECOPROP. However, a grass like chickweed can be treated with QUINCLORAL.

TABLE 1

| WEED | HERBICIDE |
|---|---|
| Broadleaf winter annual (e.g., Chickweed, Dead nettle, Hairy bittercress, Henbit, Sheperd's purse, and Speedwell) | Non-selective Herbicide (e.g., Glyphosate, diquat, and vinegar) Broadleaf postemergent herbicide (SLEDGEHAMMER, ENDRUN WITH TRIMEC, BATTLESHIP III, 2,4-D; MCPP (mecoprop); MCPA; Dicamba; Triclopyr; Carfentrazone) Organic (vinegar, potassium salts of fatty acid, iron, and clove oil) |
| Broadleaf Summer Annual (including Black Medic, Carpetweed, Common Lespedeza, Knotweed, Mallow, Oxalis, Prostrate spurge, and Purslane) | Non-selective Herbicide (e.g., Glyphosate, diquat, Organic (vinegar, potassium salts of fatty acid, iron, and clove oil) Broadleaf postemergent herbicide (SLEDGEHAMMER, ENDRUN WITH TRIMEC, BATTLESHIP III, 2,4-D; MCPP (mecoprop); MCPA; Dicamba; Triclopyr; Carfentrazone)) |
| Broadleaf Perennial (including Curly dock; Buckhorn plantain; common cinquefoil; Oxalis; Dandelion; ground ivy; indian strawberry; mouse-ear chickweed; red sorrel; white clover; wild onion; wild violet; yarrow) | Non-selective Herbicide (e.g., Glyphosate, diquat, Organic (vinegar, potassium salts of fatty acid, iron, and clove oil) Broadleaf postemergent herbicide (SLEDGEHAMMER, ENDRUN WITH TRIMEC, BATTLESHIP III, 2,4-D; MCPP (mecoprop); MCPA; Dicamba; Triclopyr; Carfentrazone)) |
| Grassy Winter Annual (annual blue grass) | Pre-emergent herbicide (DIMENSION 2EW; HALTS; BARRICADE; TUPERSAN; HI-YIELD; TENACITY; PRODIAMINE 65WDG; PENDULUM) Post-emergent (QUINCLORAC; FENOXAPROP-P-ETHYL) Organic (vinegar, potassium salts of fatty acid, iron, and clove oil) |
| Grassy Summer Annual (Crabgrass; Goosegrass; Japanese Stiltgrass) | Pre-emergent herbicide (DIMENSION 2EW; HALTS; BARRICADE; TUPERSAN; HI-YIELD; TENACITY; PRODIAMINE 65WDG; PENDULUM) Post-emergent (QUINCLORAC; FENOXAPROP-P-ETHYL) Organic (vinegar, potassium salts of fatty acid, iron, and clove oil) |
| Grassy perennial weeds/ sedges (including wiregrass; dallisgrass; nimblewill; orchardgrass; quackgrass; and yellow nutsedge) | Non-selective Herbicide (e.g., Glyphosate, diquat, and vinegar) Post-emergent selective (Halosulfuron) Organic (vinegar, potassium salts of fatty acid, iron, and clove oil) |

Table 2, below, describes the types of weeds, and associated spray pattern options and spray volumes for an initial cycle, and then subsequent cycles. For example, broadleaf winter annuals are sprayed with varying size spray area and spray pattern (depending on the size of the weed). Generally, the initial treatment requires a broader spray range, with more full spray patterns. Also larger spray volumes are used in an initial cycle, with less amounts needed in the subsequent cycles. The volume of spray is also influenced by the type of weed, and the season of the year. For example, in Virginia, where there are four seasons, it is not necessary to cut the lawn nearly as frequently as in the spring or summer. Thus, the time span between application intervals is typically much longer, perhaps one month, as compared to weekly in the summer time. Thus, subsequent cycles for broadleaf annuals may require a higher volume than summer annuals.

TABLE 2

| WEED | SPRAY AREA/PATTERN | SPRAY VOLUME |
|---|---|---|
| Broadleaf winter annual | .25" inch to 5" (first spray cycle); .25" to 1" (second and subsequent spray cycle); spray range: spot spray to fullest broad spray | .1 to .5 oz per inch (first spray cycle); .1 to .25 oz per inch (second and subsequent spray cycles) |
| Broadleaf Summer Annual | .25" inch to 2" (first spray cycle); .25" to .5" (second and subsequent spray cycle); spray range: spot spray to moderate broad spray | .1 to .25 oz per inch (first spray cycle); .05 to .2 oz per inch (second and subsequent spray cycles) |
| Broadleaf Perennial | 25" inch to 2" (first spray cycle); .25" to .5" (second and subsequent spray cycle); spray range: spot spray to moderate broad spray | .1 to .5 oz per inch (first spray cycle); .1 to .25 oz per inch (second and subsequent spray cycles) |
| Grassy Winter Annual | .25" inch to 5" (first spray cycle); .1" to .5" (second and subsequent spray cycle); spray range: spot spray to narrow spray | .05 to .25 oz per inch (first spray cycle); .05 to .2 oz per inch (second and subsequent spray cycles) |
| Grassy Summer Annual | .25" inch to 5" (first spray cycle); .25" to 5" (second and subsequent spray cycle); spray range: spot spray to broad spray | .1 to .5 oz per inch (first spray cycle); .1 to .25 oz per inch (second and subsequent spray cycles) |
| Grassy perennial weeds/ sedges | .25" inch to 5" (first spray cycle); .25" to 2" (second and subsequent spray cycle); spray range: spot spray to broad spray | .1 to .5 oz per inch (first spray cycle); .1 to .25 oz per inch (second and subsequent spray cycles) |

Figure 9:
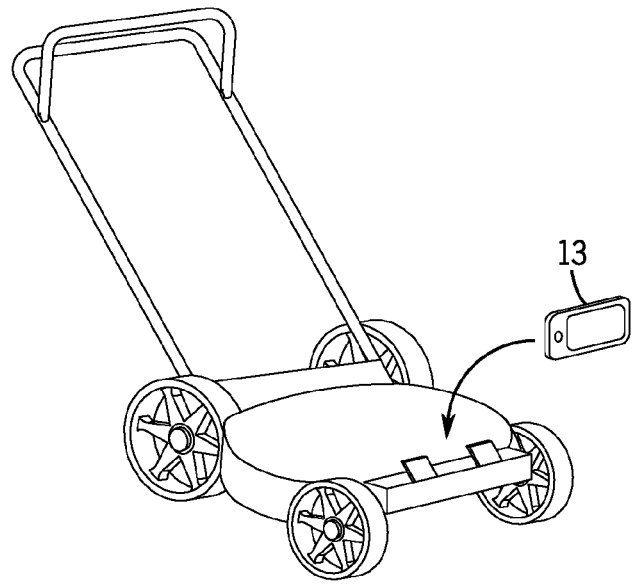
FIG. 9 is a system diagram of a smartphone-based embodiment of the SHARP system.

FIG. 9 is similar to FIG. 1 although it shows that a mounting bracket may be used to hold the Smartphone 13 for use as the front scanner 3. Alternatively, or supplementary, the back scanner 7 may also use the Smartphone 13 as the scanning circuitry for the back scanner 7.

Figure 10:
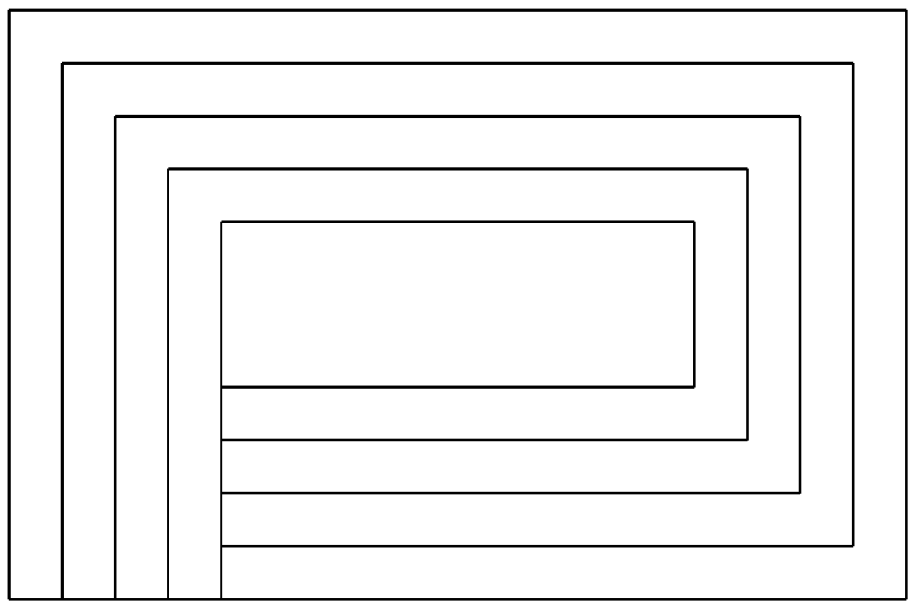
FIG. 10 is a plan view of an exemplary track pattern followed by a lawnmower or fertilizer-spreader over a treatment area according the to the present disclosure.

FIG. 10 shows the track of the lawn mower 1 when cutting the particular lawn. This track merely shows how the lawn mower may traverse the lawn so that particular locations on the lawn may be identified and anticipated by the lawn mower in a subsequent application process where the respective herbicide or insecticide are applied through the spray nozzles at the appropriate locations in a subsequent detection of the weed the next time the lawn mower system is used on a particular lawn. It is not necessary that the same track be followed from servicing operation to servicing operation. Nevertheless, by following the similar track, it provides an opportunity for the lawn mower to anticipate an upcoming weed and apply the the herbicide or insecticide at the location being approached by the lawn mower system.

Figure 11:
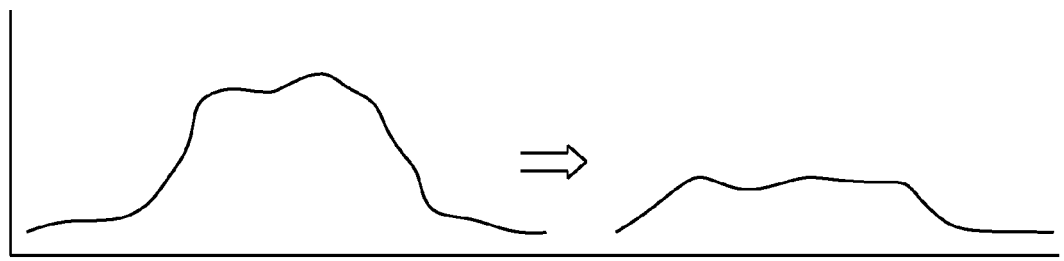
FIG. 11 shows a change in shape of an anthill before and after being mowed over.

For illustrative purposes, weeds and herbicides were mainly described herein. However, the structures and processes described herein are also equally applicable to insect nests, and fungus. FIG. 11 shows before and after images of an insect mound (e.g., anthill) where the left side image shows a higher insect mound before the cutting operation and the right side image shows an example mound after the cutting. While fungus is generally unaffected by a lawnmower blade, the system described herein may effectively identify, treat, and monitor fungus spots in a lawn when the SHARP smart cartridge 11 is filled with fungicide.

Table 3 is populated with example values of volumes of particular pesticides for exemplary insect nests in a treatment area. Images of insects in Virginia, as well as other states, is found at "A Lawn To Dye For—How to Create a Perfect Lawn: Fighting Lawn Pests", Michael Goatley, CSES-42NP, Virginia Cooperative Extension, Virginia Tech, Oct. 29, 2012, the entire contents of which is incorporated by reference in its entirety.

TABLE 3

| Type of Insect | Size of nest | Spray Area/Spray pattern | Insecticide and Spray volume |
|---|---|---|---|
| Grub Worms | 1 to 4" patch, subsoil; detectable as brown area surrounded by live grass plants | 1 to 4" diameter; wide spray pattern for 1 to 2" and fan spray for 2" to 4" | carbaryl and trichlorfon; .1 to 1 oz |
| Chinch Bugs | 2" to 2' area with Yellow/brown grass blades; expanding area over time to possibly more than 10 sq-ft | 10 to 20" swath/fan pattern | Talstar and Acephate; .1 to 2 ounces/1000 feet |
| Pavement ants | 1 to 5" Mound of dirt/sand with opening at top | 1 to 5"; narrow pattern directed to nest opening | Taurus SC, Termidor SC, or Phantom Aerosol; .1 to .5 oz |
| Ground nesting bees (e.g., Colletes inaequalis) | ½" to 3" dirt/sand piles and/or bare spot with ¼" to ½" hole/opening | ¼" to ½"; narrow pattern directed to nest opening | Spectracide .1 to .5 oz; pyrethrum .1 to .5 oz |

FIG. 11 shows a change in shape of an anthill before and after being mowed over. The Y-axis is height and the X-axis is width. As can be seen, the height of the ant hill prior to cutting is generally taller, typically 1 to 2 inches in height in a lawn, than after the lawnmower passes over the anthill and blows away the upper portion of the anthill. The residual height of the anthill is typically ½ inch. This change in height is not particularly relevant the first time the anthill is detected because the anthill is not being treated. However, in a subsequent pass, when the anthill is treated with a pesticide, the shape of the anthill will change, as described above, and so the back scanner 7 will be checking for the lower profile anthill before the smart cartridge 11 treats the anthill.

Figure 12:
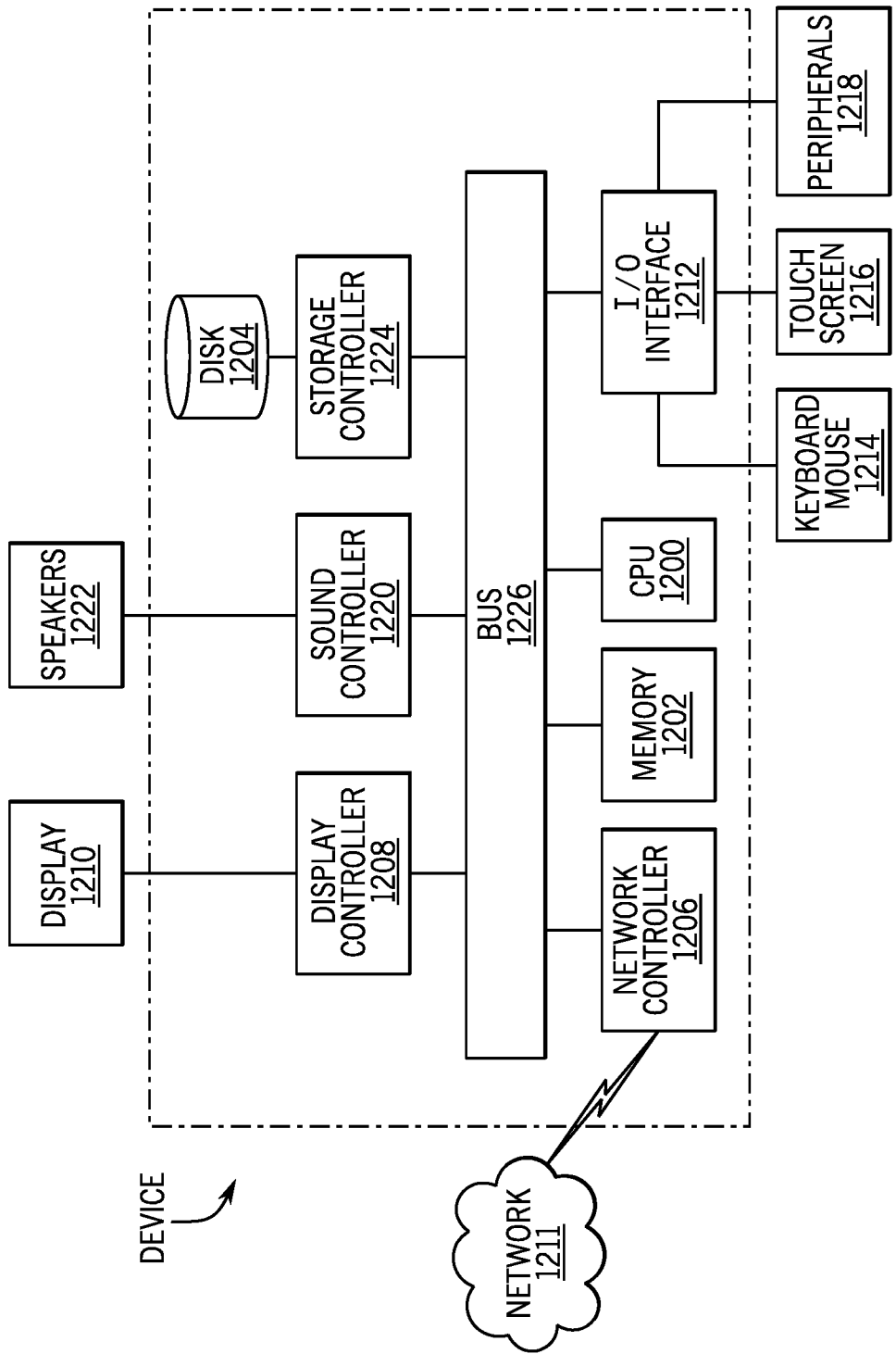
FIG. 12 is a schematic diagram of controller circuitry employed in an exemplary embodiment of the SHARP system.

FIG. 12 is a schematic diagram of controller circuitry employed in an exemplary embodiment of the SHARP system. In FIG. 12, the SHARP system includes a CPU 1200 which performs the processes described above/below. The process data and instructions may be stored in memory 1202. These processes and instructions may also be stored on a storage medium disk 1204 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the SHARP system communicates, such as a server or computer.

Further, the claimed advancements may be provided as a utility application, background daemon, or component of an operating system, or combination thereof, executing in conjunction with CPU 1200 and an operating system such as Microsoft Windows 7, UNIX, Solaris, LINUX, Apple MAC-OS and other systems known to those skilled in the art.

The hardware elements in order to achieve the SHARP system may be realized by various circuitry elements, known to those skilled in the art. For example, CPU 1200 may be a Xenon or Core processor from Intel of America or an Opteron processor from AMD of America, or may be other processor types that would be recognized by one of ordinary skill in the art. Alternatively, the CPU 1200 may be implemented on an FPGA, ASIC, PLD or using discrete logic circuits, as one of ordinary skill in the art would recognize. Further, CPU 1200 may be implemented as multiple processors cooperatively working in parallel to perform the instructions of the inventive processes described above.

The SHARP system in FIG. 12 also includes a network controller 1206, such as an Intel Ethernet PRO network interface card from Intel Corporation of America, for interfacing with network 1211. As can be appreciated, the network 1211 can be a public network, such as the Internet, or a private network such as an LAN or WAN network, or any combination thereof and can also include PSTN or ISDN sub-networks. The network 1211 can also be wired, such as an Ethernet network, or can be wireless such as a cellular network including EDGE, 3G and 4G wireless cellular systems. The wireless network can also be WiFi, Bluetooth, or any other wireless form of communication that is known.

The SHARP system further includes a display controller 1208, such as a NVIDIA GeForce GTX or Quadro graphics adaptor from NVIDIA Corporation of America for interfacing with display 1210, such as a Hewlett Packard HPL2445w LCD monitor. A general purpose I/O interface 1212 interfaces with a keyboard and/or mouse 1214 as well as a touch screen panel 1216 on or separate from display 1210. General purpose I/O interface also connects to a variety of peripherals 1218 including printers and scanners, such as an OfficeJet or DeskJet from Hewlett Packard.

A sound controller 1220 is also provided in the SHARP system, such as Sound Blaster X-Fi Titanium from Creative, to interface with speakers/microphone 1222 thereby providing sounds and/or music.

The general purpose storage controller 1224 connects the storage medium disk 1204 with communication bus 1226, which may be an ISA, EISA, VESA, PCI, or similar, for interconnecting all of the components of the SHARP system. A description of the general features and functionality of the display 1210, keyboard and/or mouse 1214, as well as the display controller 1208, storage controller 1224, network controller 1206, sound controller 1220, and general purpose I/O interface 1212 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 13.

Figure 13:
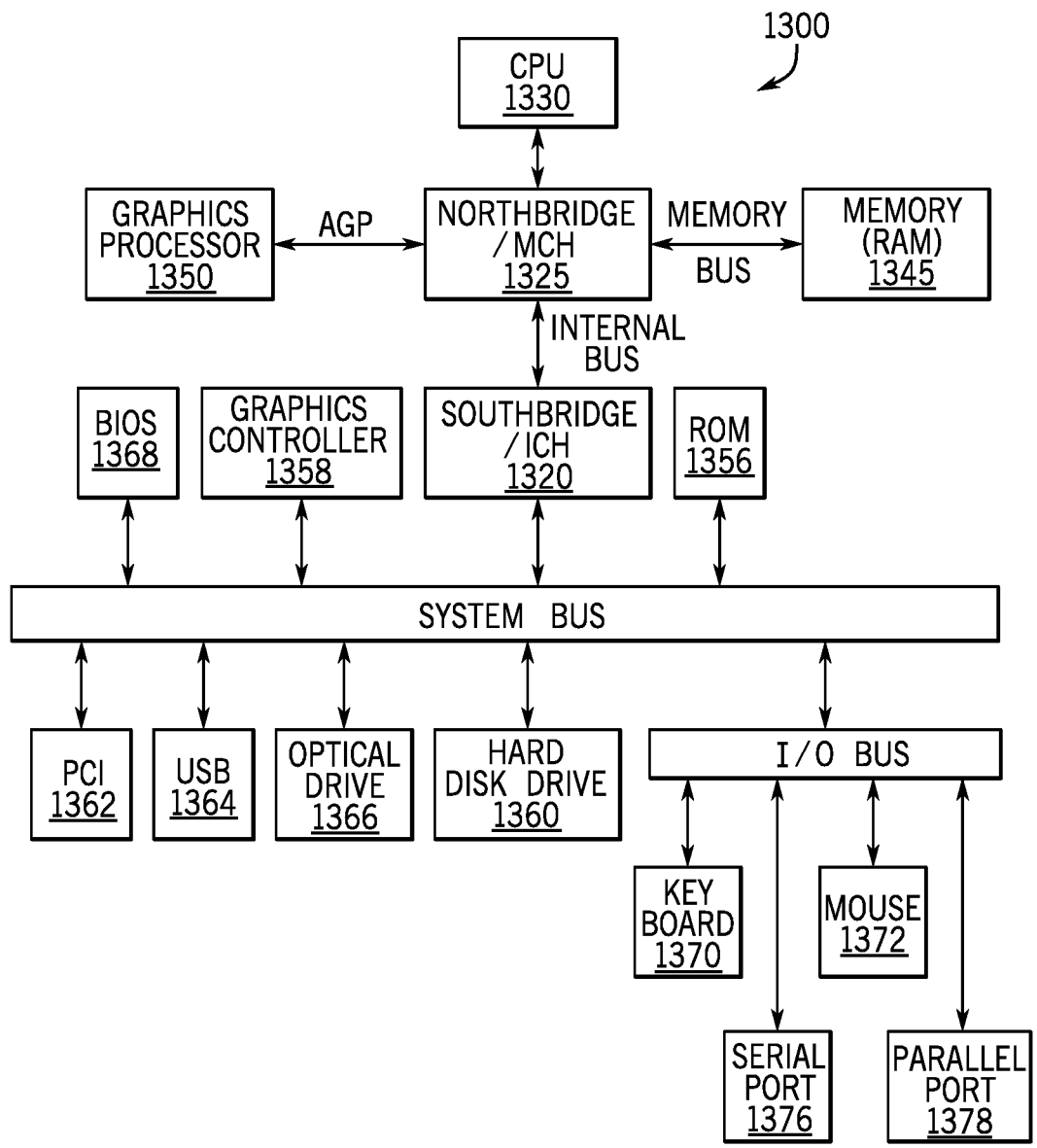
FIG. 13 is a schematic diagram of a chip set based controller according to an exemplary embodiment of the SHARP system.

FIG. 13 shows a schematic diagram of a data processing system, according to certain embodiments, for performing the control operations of the lawnmower electronics. The data processing system is an example of a computer in which code or instructions implementing the processes of the illustrative embodiments may be located.

In FIG. 13, data processing system 1300 employs a hub architecture including a north bridge and memory controller hub (NB/MCH) 1325 and a south bridge and input/output (I/O) controller hub (SB/ICH) 1320. The central processing unit (CPU) 1330 is connected to NB/MCH 1325. The NB/MCH 1325 also connects to the memory 1345 via a memory bus, and connects to the graphics processor 1350 via an accelerated graphics port (AGP). The NB/MCH 1325 also connects to the SB/ICH 1320 via an internal bus (e.g., a unified media interface or a direct media interface). The CPU Processing unit 1330 may contain one or more processors and even may be implemented using one or more heterogeneous processor systems.

Figure 14:
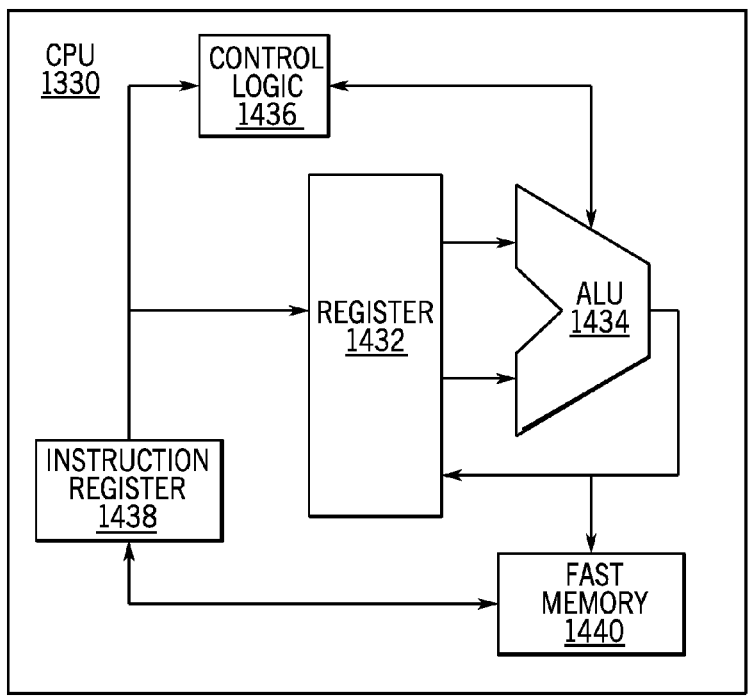
FIG. 14 is a schematic diagram of an exemplary CPU according to one embodiment.

For example, FIG. 14 shows one implementation of CPU 1330. In one implementation, the instruction register 1438 retrieves instructions from the fast memory 1440. At least part of these instructions are fetched from the instruction register 1438 by the control logic 1436 and interpreted according to the instruction set architecture of the CPU 1330. Part of the instructions can also be directed to the register 1432. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 1434 that loads values from the register 1432 and performs logical and mathematical operations on the loaded values according to the instructions. The results from these operations can be feedback into the register and/or stored in the fast memory 1440. According to certain implementations, the instruction set architecture of the CPU 1330 can use a reduced instruction set architecture, a complex instruction set architecture, a vector processor architecture, a very large instruction word architecture. Furthermore, the CPU 1330 can be based on the Von Neuman model or the Harvard model. The CPU 1330 can be a digital signal processor, an FPGA, an ASIC, a PLA, a PLD, or a CPLD. Further, the CPU 1330 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 13, the data processing system 1300 can include that the SB/ICH 1320 is coupled through a system bus to an I/O Bus, a read only memory (ROM) 1356, universal serial bus (USB) port 1364, a flash binary input/output system (BIOS) 1368, and a graphics controller 1358. PCI/PCIe devices can also be coupled to SB/ICH through a PCI bus 1362.

The PCI devices may include, for example, Ethernet adapters, add-in cards, and PC cards for notebook computers. The Hard disk drive 1360 and CD-ROM 1366 can use, for example, an integrated drive electronics (IDE) or serial advanced technology attachment (SATA) interface. In one implementation the I/O bus can include a super I/O (SIO) device.

Further, the hard disk drive (HDD) 1360 and optical drive 1366 can also be coupled to the SB/ICH 1320 through a system bus. In one implementation, a keyboard 1370, a mouse 1372, a parallel port 1378, and a serial port 1376 can be connected to the system bust through the I/O bus. Other peripherals and devices that can be connected to the SB/ICH 1320 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

The functions and features described herein may also be executed by various distributed components of a system. For example, one or more processors may execute these system functions, wherein the processors are distributed across multiple components communicating in a network. The distributed components may include one or more client and server machines, which may share processing, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

Figure 15:
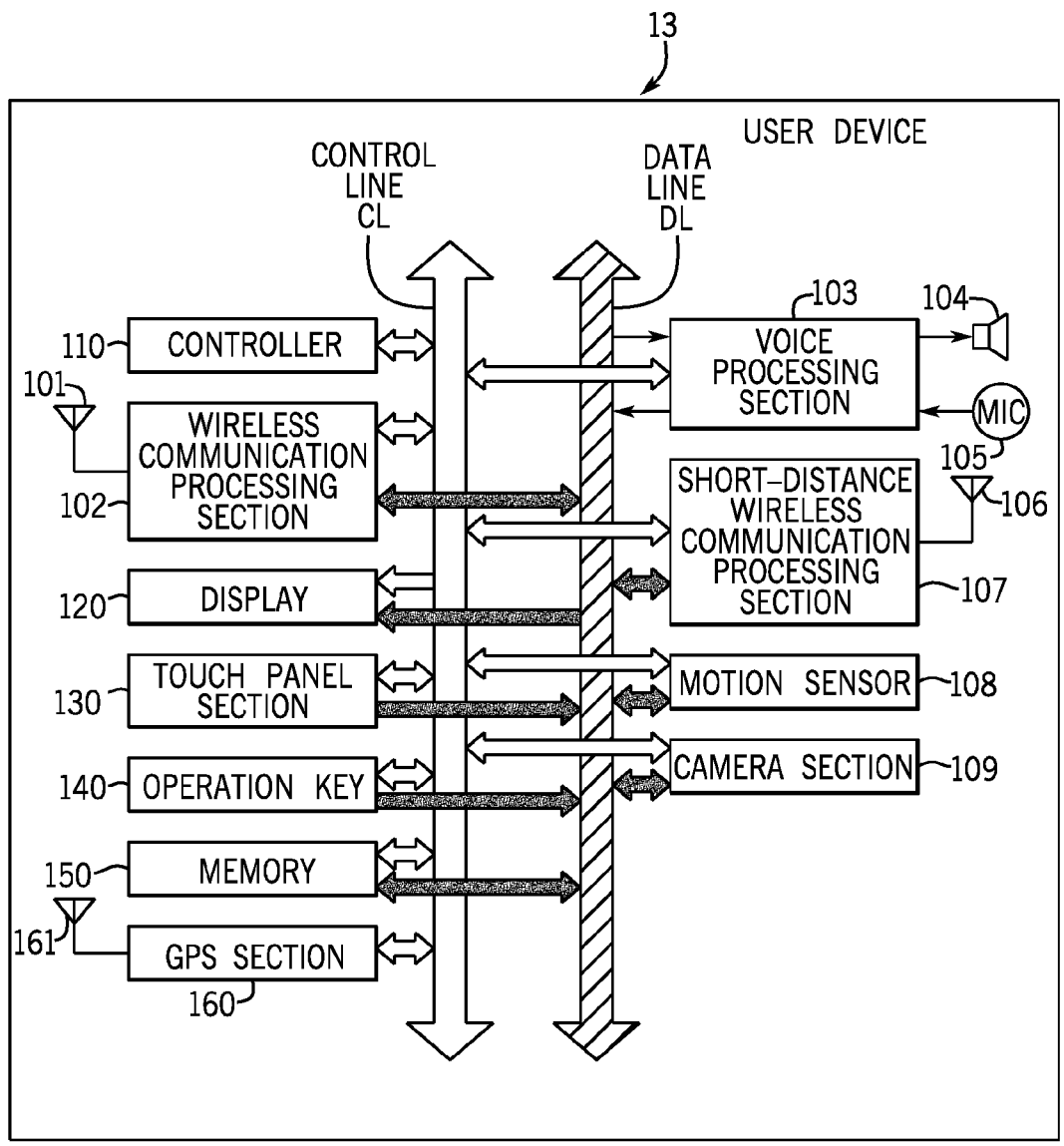
FIG. 15 is a schematic diagram of a mobile device that may be employed for imaging, processing, communications and control, according to one embodiment.

FIG. 15 is a more detailed block diagram illustrating an exemplary user device 13 according to certain embodiments of the present disclosure. In certain embodiments, user device 13 may be a smartphone. However, the skilled artisan will appreciate that the features described herein may be adapted to be implemented on other devices (e.g., a laptop, a tablet, a server, an e-reader, a camera, a navigation device, etc.). The exemplary user device 13 of FIG. 15 includes a controller 110 and a wireless communication processor 102 connected to an antenna 101. A speaker 104 and a microphone 105 are connected to a voice processor 103.

The controller 110 may include one or more Central Processing Units (CPUs), and may control each element in the user device 13 to perform functions related to communication control, audio signal processing, control for the audio signal processing, still and moving image processing and control, and other kinds of signal processing. The controller 110 may perform these functions by executing instructions stored in a memory 150. Alternatively or in addition to the local storage of the memory 150, the functions may be executed using instructions stored on an external device accessed on a network or on a non-transitory computer readable medium.

The memory 150 is an example of the storage unit 21 shown in FIG. 1 and includes but is not limited to Read Only Memory (ROM), Random Access Memory (RAM), or a memory array including a combination of volatile and non-volatile memory units. The memory 150 may be utilized as working memory by the controller 110 while executing the processes and algorithms of the present disclosure. Additionally, the memory 150 may be used for long-term storage, e.g., of image data and information related thereto. The memory 150 may be configured to store the battle view information, operation view information and list of commands.

The user device 13 includes a control line CL and data line DL as internal communication bus lines. Control data to/from the controller 110 may be transmitted through the control line CL. The data line DL may be used for transmission of voice data, display data, etc.

The antenna 101 transmits/receives electromagnetic wave signals between base stations for performing radio-based communication, such as the various forms of cellular telephone communication. The wireless communication processor 102 controls the communication performed between the user device 13 and other external devices via the antenna 101. For example, the wireless communication processor 102 may control communication between base stations for cellular phone communication.

The speaker 104 emits an audio signal corresponding to audio data supplied from the voice processor 103. The microphone 105 detects surrounding audio and converts the detected audio into an audio signal. The audio signal may then be output to the voice processor 103 for further processing. The voice processor 103 demodulates and/or decodes the audio data read from the memory 150 or audio data received by the wireless communication processor 102 and/or a short-distance wireless communication processor 107. Additionally, the voice processor 103 may decode audio signals obtained by the microphone 105.

The exemplary user device 13 may also include a display 120, a touch panel 130, an operation key 140, and a short-distance communication processor 107 connected to an antenna 106. The display 120 may be a Liquid Crystal Display (LCD), an organic electroluminescence display panel, or another display screen technology. In addition to displaying still and moving image data, the display 120 may display operational inputs, such as numbers or icons which may be used for control of the user device 13. The display 120 may additionally display a GUI for a user to control aspects of the user device 13 and/or other devices. Further, the display 120 may display characters and images received by the user device 13 and/or stored in the memory 150 or accessed from an external device on a network. For example, the user device 13 may access a network such as the Internet and display text and/or images transmitted from a Web server.

The touch panel 130 may include a physical touch panel display screen and a touch panel driver. The touch panel 130 may include one or more touch sensors for detecting an input operation on an operation surface of the touch panel display screen. The touch panel 130 also detects a touch shape and a touch area. Used herein, the phrase "touch operation" refers to an input operation performed by touching an operation surface of the touch panel display with an instruction object, such as a finger, thumb, or stylus-type instrument. In the case where a stylus or the like is used in a touch operation, the stylus may include a conductive material at least at the tip of the stylus such that the sensors included in the touch panel 130 may detect when the stylus approaches/contacts the operation surface of the touch panel display (similar to the case in which a finger is used for the touch operation).

In certain aspects of the present disclosure, the touch panel 130 may be disposed adjacent to the display 120 (e.g., laminated) or may be formed integrally with the display 120. For simplicity, the present disclosure assumes the touch panel 130 is formed integrally with the display 120 and therefore, examples discussed herein may describe touch operations being performed on the surface of the display 120 rather than the touch panel 130. However, the skilled artisan will appreciate that this is not limiting.

For simplicity, the present disclosure assumes the touch panel 130 is a capacitance-type touch panel technology. However, it should be appreciated that aspects of the present disclosure may easily be applied to other touch panel types (e.g., resistance-type touch panels) with alternate structures. In certain aspects of the present disclosure, the touch panel 130 may include transparent electrode touch sensors arranged in the X-Y direction on the surface of transparent sensor glass.

The touch panel driver may be included in the touch panel 130 for control processing related to the touch panel 130, such as scanning control. For example, the touch panel driver may scan each sensor in an electrostatic capacitance transparent electrode pattern in the X-direction and Y-direction and detect the electrostatic capacitance value of each sensor to determine when a touch operation is performed. The touch panel driver may output a coordinate and corresponding electrostatic capacitance value for each sensor. The touch panel driver may also output a sensor identifier that may be mapped to a coordinate on the touch panel display screen. Additionally, the touch panel driver and touch panel sensors may detect when an instruction object, such as a finger is within a predetermined distance from an operation surface of the touch panel display screen. That is, the instruction object does not necessarily need to directly contact the operation surface of the touch panel display screen for touch sensors to detect the instruction object and perform processing described herein. For example, in certain embodiments, the touch panel 130 may detect a position of a user's finger around an edge of the display panel 120 (e.g., gripping a protective case that surrounds the display/touch panel). Signals may be transmitted by the touch panel driver, e.g. in response to a detection of a touch operation, in response to a query from another element based on timed data exchange, etc.

The touch panel 130 and the display 120 may be surrounded by a protective casing, which may also enclose the other elements included in the user device 13. In certain embodiments, a position of the user's fingers on the protective casing (but not directly on the surface of the display 120) may be detected by the touch panel 130 sensors. Accordingly, the controller 110 may perform display control processing described herein based on the detected position of the user's fingers gripping the casing. For example, an element in an interface may be moved to a new location within the interface (e.g., closer to one or more of the fingers) based on the detected finger position.

Further, in certain embodiments, the controller 110 may be configured to detect which hand is holding the user device 13, based on the detected finger position. For example, the touch panel 130 sensors may detect a plurality of fingers on the left side of the user device 13 (e.g., on an edge of the display 120 or on the protective casing), and detect a single finger on the right side of the user device 13. In this exemplary scenario, the controller 110 may determine that the user is holding the user device 13 with his/her right hand because the detected grip pattern corresponds to an expected pattern when the user device 13 is held only with the right hand.

The operation key 140 may include one or more buttons or similar external control elements, which may generate an operation signal based on a detected input by the user. In addition to outputs from the touch panel 130, these operation signals may be supplied to the controller 110 for performing related processing and control. In certain aspects of the present disclosure, the processing and/or functions associated with external buttons and the like may be performed by the controller 110 in response to an input operation on the touch panel 130 display screen rather than the external button, key, etc. In this way, external buttons on the user device 20 may be eliminated in lieu of performing inputs via touch operations, thereby improving water-tightness.

The antenna 106 may transmit/receive electromagnetic wave signals to/from other external apparatuses, and the short-distance wireless communication processor 107 may control the wireless communication performed between the other external apparatuses. Bluetooth, IEEE 802.11, and near-field communication (NFC) are non-limiting examples of wireless communication protocols that may be used for inter-device communication via the short-distance wireless communication processor 107.

The user device 13 may include a motion sensor 108. The motion sensor 108 may detect features of motion (i.e., one or more movements) of the user device 13. For example, the motion sensor 108 may include an accelerometer to detect acceleration, a gyroscope to detect angular velocity, a geomagnetic sensor to detect direction, a geo-location sensor to detect location, etc., or a combination thereof to detect motion of the user device 13. In certain embodiments, the motion sensor 108 may generate a detection signal that includes data representing the detected motion. For example, the motion sensor 108 may determine a number of distinct movements in a motion (e.g., from start of the series of movements to the stop, within a predetermined time interval, etc.), a number of physical shocks on the user device 20 (e.g., a jarring, hitting, etc., of the electronic device), a speed and/or acceleration of the motion (instantaneous and/or temporal), or other motion features. The detected motion features may be included in the generated detection signal. The detection signal may be transmitted, e.g., to the controller 110, whereby further processing may be performed based on data included in the detection signal. The motion sensor 108 can work in conjunction with a Global Positioning System (GPS) section 160. The GPS section 160 detects the present position of the terminal device 100. The information of the present position detected by the GPS section 160 is transmitted to the controller 110. An antenna 161 is connected to the GPS section 160 for receiving and transmitting signals to and from a GPS satellite.

The user device 13 may include a camera section 109, which includes a lens and shutter for capturing photographs of the surroundings around the user device 13. In an embodiment, the camera section 109 captures surroundings of an opposite side of the user device 13 from the user. The images of the captured photographs can be displayed on the display panel 120. A memory section saves the captured photographs. The memory section may reside within the camera section 109 or it may be part of the memory 150. The camera section 109 can be a separate feature attached to the user device 13 or it can be a built-in camera feature. The above-described hardware description is a non-limiting example of corresponding structure for performing the functionality described herein.

Obviously, numerous modifications and variations of the present invention are possible in light of the above teachings. It is therefore to be understood that within the scope of the appended claims, the invention may be practiced otherwise than as specifically described herein.

The invention claimed is:

1. A lawn treatment apparatus comprising:
a main chassis having a plurality wheels that roll the main chassis in a moving direction along a path across a lawn in response receiving a motive force, the main chassis having a front side and rear side with respect to the moving direction;
a front scanner disposed on the front side of the main chassis and oriented to capture a plurality of images of portions of the lawn that include an area with a center between 0 inches and 12 inches in front of the main chassis, the plurality of images forming a sequence of scanned images of portions of the lawn along the path;
a non-transitory memory configured to store at least a portion of the plurality of images;
a trolley that is connected to and towed behind the main chassis, the trolley including a trolley chassis that is spaced a predetermined distance of at least 3 feet behind the rear side of the main chassis;
a cartridge that is detachably attached to the trolley chassis, and having a first reservoir configured to hold a first chemical, and a second reservoir configured to hold a second chemical, the first chemical being one of an herbicide, a pesticide and a fungicide, the second chemical being one of a different herbicide, a different pesticide and a different fungicide;
a plurality of controllable nozzles operatively connected to the first reservoir and the second reservoir of the cartridge;
a nozzle controller that controllably regulates which of the first chemical and second chemical is provided to respective of the controllable nozzles, and controls a spray pattern of the respective of the controllable nozzles;
a processor configured to record a location of a feature in the lawn that resembles a type of weed, insect nest or fungal spot, wherein
in a first or subsequent pass of the chassis along the path, the processor is configured to identify the location of the feature and the feature and trigger the nozzle controller to dispense at least one of the first chemical and second chemical through one or more of the plurality of controllable nozzles onto a corresponding portion of the lawn where the feature was detected,
the processor triggers the nozzle to dispense the at least one of the first chemical and second chemical after the main chassis has passed over the portion of the lawn and is positioned within a coverage range of the nozzle, and
the dispensed chemical being selected by the processor to treat the target object.

2. The lawn treatment apparatus of claim 1, wherein the processor is configured to perform image comparison of a stored target object and features in the plurality images to determine if there is a match between the stored target object and the feature in the lawn, the stored target object being a type of a weed, an insect nest, and a fungal spot.

3. The lawn treatment apparatus of claim 2, wherein the main chassis is a lawnmower.

4. The lawn treatment apparatus of claim 3, further comprising
a rear scanner disposed on the trolley chassis and configured to detect the feature after the feature has been cut by the lawnmower.

5. The lawn treatment apparatus of claim 4,
wherein the rear scanner is configured to receive an input from the processor regarding the location of the feature, and use the input to assist in detecting the location an size of the feature after the feature has been cut and prior to the nozzle treating the feature with the dispensed chemical.

6. The lawn treatment apparatus of claim 5, wherein nozzle is controlled to adjust at least one of a spray pattern and a volume to match the size of the feature after the feature has been cut.

7. The lawn treatment apparatus of claim 3, wherein the processor is configured to compare a change in size of the feature in subsequent lawnmowing operations and determine whether to adjust a type of chemical based on the change in size.

8. The lawn treatment apparatus of claim 1, further comprising:
a transmitter configured to transmit at least a portion of the plurality of images to a remote computer so that the remote computer can perform image comparison of a stored target object and features in the plurality images to determine if there is a match between the stored target object and the feature in the lawn, the stored target object being a type of a weed, an insect nest, and a fungal spot.

9. The lawn treatment apparatus of claim 8, wherein the transmitter is configured to transmit an order request to the remote computer for the remote computer to fill another cartridge with chemicals that selectively treat the type of weeds, insect nests, and/or fungus detected in the lawn.

10. The lawn treatment apparatus of claim 9, wherein the transmission is an automatic wireless transmission, and the another cartridge is delivered to an address corresponding to a location of the lawn.

11. The lawn treatment apparatus of claim 9, wherein the transmission is a manually initiated transmission that is wireless or through a physical wired connection.

12. The lawn treatment apparatus of claim 3, wherein the lawnmower is a self-guided lawnmower that follows a same path during different lawncutting operations spaced apart in time by a week or more.

13. The lawn treatment apparatus of claim 1, wherein the main chassis is configured to have a smartphone mounted on the front side such that the smartphone serves as the front scanner and processor.

14. The lawn treatment apparatus of claim 4, wherein the rear scanner comprising a smartphone.

15. A lawn treatment system comprising:
   a remote facility including
      a remote computer, and
      a chemical filling station located at a remote location; and
   a lawn treatment apparatus comprising:
   a main chassis having a plurality wheels that roll the main chassis in a moving direction along a path across a lawn in response receiving a motive force, the main chassis having a front side and rear side with respect to the moving direction;
   a front scanner disposed on the front side of the main chassis and oriented to capture a plurality of images of portions of the lawn that include an area with a center between 0 inches and 12 inches in front of the main chassis, the plurality of images forming a sequence of scanned images of portions of the lawn along the path;
   a non-transitory memory configured to store at least a portion of the plurality of images;
   a trolley that is connected to and towed behind the main chassis, the trolley including a trolley chassis that is spaced a predetermined distance of at least 3 feet behind the rear side of the main chassis;
   a cartridge that is detachably attached to the trolley chassis, and having a first reservoir configured to hold a first chemical, and a second reservoir configured to hold a second chemical, the first chemical being one of an herbicide, a pesticide and a fungicide, the second chemical being one of a different herbicide, a different pesticide and a different fungicide;
   a plurality of controllable nozzles operatively connected to the first reservoir and the second reservoir of the cartridge;
   a nozzle controller that controllably regulates which of the first chemical and second chemical is provided to respective of the controllable nozzles, and controls a spray pattern of the respective of the controllable nozzles;
   a transmitter configured to transmit at least a portion of the plurality of images to the remote computer; and
   a processor configured to record a location of a feature in the lawn that resembles a type of weed, insect nest or fungal spot, wherein
   in a first or subsequent pass of the chassis along the path, the processor is configured to identify the location of the feature and the feature and trigger the nozzle controller to dispense at least one of the first chemical and second chemical through one or more of the plurality of controllable nozzles onto a corresponding portion of the lawn where the feature was detected,
   the processor triggers the nozzle to dispense the at least one of the first chemical and second chemical after the main chassis has passed over the portion of the lawn and is positioned within a coverage range of the nozzle, and
   the dispensed chemical being selected by the processor to treat the target object, wherein
   the remote computer is configured to perform image comparison of a stored target object and features in the plurality images to determine if there is a match between the stored target object and the feature in the lawn, the stored target object being a type of a weed, an insect nest, and a fungal spot, and the remote computer is configured to identify the chemicals that are effective at treating the weeds, insect nests, and/or fungus in the lawn, and
   in response to receiving filling instructions from the remote computer the filling station fills another cartridge with the chemicals identified by the remote computer.

16. The lawn treatment system of claim 15, wherein the remote facility further including a shipping center that is configured to package and ship the another cartridge to a predetermined address.

* * * * *